2,896,264
Patented July 28, 1959

2,896,264

METHOD OF MAKING SHAPED ARTICLES OF CRYSTALLINE POLYSTYRENE

Giulio Natta, Milan, and Giovanni Crespi, Busto Arsizio, Italy, assignors to Montecatini Societa Generale per l'Industria Mineraria e Chimica, Milan, Italy No Drawing. Application November 5, 1957
Serial No. 694,488

11 Claims. (Cl. 18—55)

This invention relates to shaped articles of a crystalline polymeric alpha-olefine. More particularly, the invention is concerned with methods of making shaped articles of crystalline polystyrene.

One of us, G. Natta, together with other co-workers, has recently disclosed that when an alpha-olefine of the formula $CH_2$=CHR (in which R is a hydrocarbon radical) is polymerized with the aid of certain catalysts, the polymerizate comprises a mixture of crystallizable (isotactic) and non-crystallizable (atactic) polymers which is more or less rich in the polymers having the isotactic structure.

The isotactic polymers are normally solid, linear, regular head-to-tail crystallizable polymers having substantially no branches longer than R and made up essentially of macromolecules in which substantially all of the asymmetric tertiary main-chain carbon atoms of adjacent monomeric units have the same steric configuration and the main chain of the macromolecules, when fully extended in a plane, shows substantially all of the R groups on one side of the plane and all of the hydrogen atoms bound to the tertiary carbon atoms on the opposite side.

The non-crystallizable atactic polymers are also normally solid, linear regular head-to-tail polymers having substantially no branches longer than R, but are of entirely different steric structure, being made up essentially of macromolecules in which tertiary asymmetric carbon atoms of the main chain having the same steric configuration have substantially a random distribution. When the main chain of the macromolecules of the atactic polymers is fully extended in a plane, it shows the R groups and the hydrogen atoms bound to the tertiary carbon atoms substantially in random distribution on the two sides of the plane.

In addition to these, the polymerizates of an alpha olefine may contain polymers made up of macromolecules, only in sections of which the asymmetric tertiary main-chain carbon atoms of adjacent monomeric units have the same steric configuration (block polymers).

Articles obtained by extruding or molding the polymerizates comprising a high proportion of crystallizable, isotactic polymers exhibit different characteristics, depending on whether they consist of polymers such as polypropylene and polybutene, which have a 2nd order transition temperature below room temperature or of polymers like polystyrene the 2nd order transition temperature of which is above room temperature.

Thus, articles obtained from polymerizates of the first-mentioned class, by molding the polymerizate at temperatures close to the melting point, or by extruding the polymerizate at a higher temperature, exhibit good mechanical properties and high resilience at ordinary temperatures. The articles obtained from the polystyrene, on the other hand, normally exhibit poor mechanical properties at room temperature and the resiliency is particularly low. The mechanical properties and resilience are only slightly improved by subjecting the articles to a heat-treatment.

We attribute the unsatisfactory behaviour of the articles formed from the polystyrene mainly to the fact that, although the crystallizable, isotactic and the non-crystallizable, atactic portions of the polymerizate are completely miscible in the melted state, or as under-cooled liquids (glass), they are not miscible in the solid state when one of the components (isotactic polymer) crystallizes. Slow cooling of the melted mass of the polystyrene, or annealing of the glassy solid, results in crystallization of the isotactic polymer and separation thereof as a distinct phase from the atactic polymer which is concentrated in zones interspersed between the different crystals of isotactic polymer. At low temperature, the atactic polystyrene forms a glassy mass and the resulting product consists of a heterogeneous mixture of crystalline and glassy parts which is brittle, in some cases even more brittle than the glassy polymer alone. The increased brittleness is due to the heterogeneous nature of the mixture and the fact that, when the article comprising that mixture is subjected to mechanical stresses, the strains are irregularly distributed in it.

The articles formed from the polymers like polystyrene, which have 2nd order transition temperatures above room temperature, exhibit these undesirable properties whether they are formed from a crude polymerizate obtained directly in the polymerization of styrene, or from crude polymerizates which are further enriched by having isotactic polymer mixed therewith.

It has now been found that if crude polymerizates of styrene containing both crystallizable, isotactic and non-crystallizable, atactic polymers are carefully extracted with particular solvents to be discussed in detail below, it is possible to obtain polymeric styrenes which can be formed into shaped articles the mechanical properties and resilience of which are substantially better than those of articles normally obtained from styrene polymerizates comprising both isotactic and atactic polymers.

Natta et al. have disclosed that fractions containing a high proportion of isotactic polystyrene can be obtained by extracting mixtures of the isotactic and atactic polymers with ketones such as acetone and methyl-ethyl-ketone at temperatures not higher than the boiling point of the solvent under atmospheric pressure. In general, the fractions thus obtained show a crystallinity between 40% and 45%, even when completely free of atactic molecules. Moreover, the residue of the extraction of the crude polystyrene with methyl-ethyl-ketone does not always consist exclusively of isotactic molecules. A portion of the molecules consists of more or less frequent alternations of blocks, each block consisting of monomeric units having the same configuration.

We have found that the block polymers can be separated from the isotactic molecules by extracting the polymeric styrenes containing both types of polymers with solvents which, under the conditions of the extraction, are non-swellants for the isotactic polystyrenes. Ketones and saturated hydrocarbons can be used to extract the block polymers at temperatures above the boiling temperature of methyl-ethyl-ketone, i.e., at temperatures between 100° C. and 180° C.

The residue of such extraction is more crystalline, of higher density, has a narrower melting range than the polystyrene containing the block polymers, and exhibits improved mechanical and thermal properties.

Solvents which may be used for selectively removing the atactic polystyrene from mixtures in which it is present with the isotactic and block polystyrenes include aliphatic and cycloaliphatic ketones, more particularly methyl-ethyl-ketone, and certain esters. The residue comprising the isotactic and block molecules can be used to form shaped articles the mechanical and thermal properties of which are better than those of articles formed from polymerizates in which the atactic polymers are also present.

However, it may be desired to also remove the block molecules, in which event methyl-ethyl-ketone may be used as the selective extraction solvent but it is then necessary to carry out the extraction at higher temperature and, usually, under somewhat increased pressure.

In any case, whether only the atactic polystyrene or both the atactic and block polymers are to be dissolved out selectively, it is always necessary to perform the extraction with methyl-ethyl-ketone or the like at temperatures considerably below the melting point of the isotactic polystyrene, since at temperatures close to the melting point of the crystals the selective action of the solvents disappears and the isotactic polymers are also dissolved.

Poor solvents can be used at temperatures not greatly lower than the melting point of the block polymers.

Articles obtained by shaping the residue remaining after extraction of the atactic and block polymers by usual shaping methods at temperatures above its melting point and then more or less quickly cooling the shaped article, still do not possess entirely satisfactory mechanical properties. We attribute this to the fact that these polystyrenes, especially those of relatively high molecular weight, have a low crystallization rate under the normal shaping conditions and articles obtained by the methods just referred to, even when formed of completely isotactic potentially crystallizable polystyrene, contain, in practice, a considerable proportion of amorphous matter which can exert an unfavorable influence on the mechanical properties of the shaped articles.

It is possible to increase the crystallinity of the polystyrene in the shaped article by subjecting the article to annealing treatments. However, the increase in crystallinity is always accompanied by variations in the density which in turn cause deformations of and distortions in the article. Moreover, the annealing treatments are time consuming, particularly when the polystyrene has a high molecular weight.

We have now found that, when shaped articles of crystalline polystyrene are desired, the disadvantages mentioned can be eliminated and shaped articles having very desirable properties can be obtained if, prior to giving the residue remaining after separation of the non-crystallizable polymers or of the non-crystallizable and block polymers, its final shape, the residue is given a preliminary shape, annealed in the preliminary shape, and then given its final form. The annealing, which induces crystallization of the polystyrene, can be effected by heating the pre-formed article at 160–180° C., and the final shaping at a temperature below the melting point of the crystals, but sufficiently high to render the polymer plastic.

Thus, the polystyrene, free of non-crystallizable portions, may be molded or extruded in the form of sheets by conventional methods and the resulting amorphous or only somewhat crystalline sheet may be subjected to prolonged annealing at elevated temperature to induce crystallization of the polystyrene. The crystalline or more highly crystalline sheet obtained may then be used as starting material for final shaping by known methods, e.g., known methods for stamping shaped objects from metal sheets, and at a temperature slightly below (70° to 5° C. below) the temperature of complete melting of the crystals. The final molding temperature can be selected depending on whether or not the polystyrene comprises block polymers having a melting point lower than the isotactic polymers.

The articles thus produced are very hard, have excellent surface gloss, are comparatively non-brittle and are useful, for instance, as substitutes for ceramics.

As an illustration, if a polystyrene which has been freed of non-crystallizable portions and having a molecular weight of about 600,000 is molded or extruded in the form of sheets by conventional methods and the sheets are annealed at 160–180° C. for a time sufficient to effect crystallization of the polystyrene, the crystalline or more highly crystalline sheets can then be finally shaped by a stamping operation at a temperature in the range between 160° C. to 225° C., i.e., at a temperature below the complete melting temperature for the crystals, which is about 230° C.

Table I below gives some of the properties of polystyrene which had been freed of atactic polymers by selective extraction of the latter. The properties of the polystyrene in both the amorphous and crystalline states are given and are compared with those of polystyrene obtained by polymerizing styrene with the aid of a catalyst which promotes the polymerization through a free radical mechanism and which does not yield isotactic, crystallizable polystyrene. In the table, A represents the polystyrene of the type with which the present invention is concerned and free of atactic portions; B represents the free radical type polystyrene.

TABLE I

| | A | | B |
|---|---|---|---|
| | Annealed (crystalline) | Quenched (amorphous) | |
| Vicat softening point (5 kg. load), ° C | 148–150 | 115–120 | 90–95 |
| Rockwell hardness, M | 97–98 | 87–88 | 70–80 |
| Izod resilience, kg. cm./cm.² | 10 | 15 | 11 |

The polystyrene has even better properties than are shown in Table I if it is further purified by extraction of, or reduction in the amount of, block polymers contained therein. On the other hand, the properties of the polystyrene from which the atactic portions are not separated are generally inferior to those shown in Table I. For example, when polystyrene containing isotactic polymers and about 40% of atactic molecules is annealed at 160° C. for two hours to effect crystallization of its isotactic portions, it has the characteristics shown in Table II.

TABLE II

Vicat softening point (5 kg. load) _____ 120–125 C.
Rockwell hardness M scale _____ Sample breaks before value can be determined.
Izod resilience kg./cm./cm.² _____ 5.

The utility of the crystallized isotactic polystyrene as a substitute for ceramics is apparent from a consideration of the physical properties of the polystyrene. In many cases, articles comprising the crystallized polystyrene have distinct advantages over ceramic articles, including the advantage of lower specific gravity.

The crystallized polystyrene of the invention has, as compared to known plastics, increased hardness and good dimensional stability even at the boiling point of water and above. Because of the last-mentioned property, it is possible to sterilize articles comprising the crystallized polystyrene with steam at 120° C.–130° C., and even at higher temperatures (up to 150° C.) which permits a reduction in the sterilization time.

The following examples are given to illustrate specific embodiments of the invention it being understood that these examples are not intended as limiting.

*Example 1*

A powdered crude, linear, regular head-to-tail polymerizate of styrene comprising a mixture of crystallizable, isotactic and non-crystallizable, atactic polymers (obtained by the methods described by Natta et al., i.e., by polymerizing styrene under atmospheric or slightly increased pressure with the aid of a catalyst prepared from a metal alkyl and a compound of a transition metal of Groups IV to VI of the Mendeleeff Periodic Table) was extracted exhaustively with methyl-ethyl-ketone at the normal boiling temperature of the solvent, to selectively dissolve the atactic polymers.

The residue of the extraction, having a molecular weight of 600,000, was molded in a vertical plate press at 260° C., under a pressure of 30 kg./cm.², to obtain laminae having a diameter of 100 mm. and a thickness of about 1 mm. The laminae were placed in an oven in which they were exposed to circulating air at 160–170° C. for 2–3 hours. During this annealing treatment, the laminae underwent distortion essentially due to the shrinkage accompanying crystallization of the polymer.

Final shaped articles were made from the annealed laminae by press-stamping at 190–200° C. under pressures below 10 kg./cm.². Laminae 10 cm. long were obtained and, when immersed in boiling water for about one and one-half hours and then cooled, the laminae either did not undergo any dimensional change or showed changes of only a few tenths of a millimeter.

*Example 2*

Polystyrene as in Example 1 was molded in a plate press at 260° C. Laminae 0.5 mm. thick were obtained. The laminae were annealed in an oven at 160° C.–170° C. to effect crystallization of the polymer and then drawn in the form of tumblers at a temperature of 180–190° C. by means of a punching die having the form of a truncated cone. No measurable distortion or change in size of the tumblers occurs when they are immersed in boiling water for about one hour.

*Example 3*

Sheets of crystallizable polystyrene were annealed for 3 hours at 170° C. as in Example 1. Dishes and tumblers were obtained from the annealed sheets by vacuum forming at 195–210° C. The shaped articles had a high gloss and a surface hardness higher than 95° Rockwell, M scale. The articles do not show any marked deformation after heating, even for long periods of time, at 100° C. and above. For instance, a tumbler kept in an aqueous calcium chloride solution at a temperature of 110–115° C. for about one-half hour, and then cooled, showed no appreciable variation in form or size.

*Example 4*

Powdered polystyrene having a crystallinity of 35–40% was extracted repeatedly with methyl-isopropyl-ketone at 100° C. The residue was injection molded at a temperature not higher than 310° C., to obtain tiles, dishes, and tumblers which, after cooling, were practically amorphous. The articles were annealed at temperatures of 160–180° C. The annealing treatment resulted in crystallization of the polystyrene but the articles underwent considerable deformation and distortion. The annealed, completely crystallized articles were then reshaped in coupled forming dies at temperatures of 180–200° C. The final shaped articles thus obtained had remarkably high gloss and a hardness greater than 95° Rockwell, M scale. These articles do not show any noteworthy permanent deformation even on repeated heating to the temperature of boiling water.

As noted previously, the polystyrenes which are treated in accordance with the invention are mixtures of isotactic, atactic and, generally, block polymers, from which at least the atactic polymers are removed by fractional dissolution, using selective solvents. Such mixtures are obtained, for example, by polymerizing styrene at a temperature of 50° C.–120° C., in an inert hydrocarbon solvent, under a pressure between normal atmospheric pressure and about 30 atmospheres, with the aid of a catalyst prepared from a metalorganic compound of a metal of Groups I–III of the Mendeleeff Periodic Table, and a compound, e.g., a halide, of a transition metal of Groups IV–VI of said Periodic Table, for instance a catalyst prepared from triethyl aluminum and titanium tetrachloride.

Various changes may be made in practicing the invention as specifically exemplified, such as changes in the solvent used in the fractionation of the starting mixture of polystyrenes and/or in the temperature at which such extraction is performed, without departing from the spirit thereof. Therefore, it is intended to include within the scope of the appended claims, all such changes and modifications in the practice of the invention as may be apparent to those skilled in the art.

What is claimed is:

1. A method for making shaped articles of crystalline, linear high polymers of styrene from polystyrenes consisting essentially of a mixture of non-crystallizable, atactic polymers, block polymers, and crystallizable, isotactic polymers of styrene, which comprises separating at least the non-crystallizable atactic polymers from the mixture of polystyrenes by extraction with a selective solvent therefor, at a temperature below the melting point of the crystallizable polymers, shaping the residue of such extraction at a temperature above the melting point of the crystallizable, isotatic polymers to obtain a pre-form, annealing the pre-form at a temperature below the melting point to effect crystallization of the crystallizable, isotactic polystyrene, and then finally shaping the annealed pre-form at a temperature below the melting point of the crystalline polystyrene.

2. The method according to claim 1, characterized in that the atactic and block polystyrenes are separated from the mixture of polymers by extraction with a ketone at a temperature below 180° C. but above the boiling temperature of methyl-ethyl-ketone.

3. The method according to claim 1, characterized in that the atactic polystyrenes are separated from the mixture of polymers by extraction with methyl-ethyl-ketone at a temperature close to the normal boiling temperature of the solvent.

4. The method according to claim 1, characterized in that the residue remaining after extraction of the atactic and block polymers is pre-formed at a temperature above 230° C.

5. The method according to claim 1, characterized in that the residue remaining after extraction of the atactic and block polymers is pre-formed to obtain a flat sheet.

6. The method according to claim 1, characterized in that the pre-form is annealed at a temperature between 160° C. and 190° C.

7. The method according to claim 1, characterized in that the annealed pre-form is given its final shape at a temperature between 160° C. and 225° C.

8. The method according to claim 1, characterized in that the pre-form is injection molded to obtain an article having a shape approximating that desired for the final article, the molded article is annealed, and the annealed article is then re-molded to final shape at a temperature between 160° C. and 225° C.

9. A method for making shaped articles of crystalline, linear, high polymers of styrenes consisting of non-crystallizable atactic polymers, block polymers, and crystallizable isotactic polymers, which comprises extracting the mixture of polymers with a ketone at a temperature below 180° C. but above the boiling point of methyl-ethyl-ketone, to selectively dissolve out the non-crystallizable atactic polymers and the block polymers, molding the residue of the extraction at a temperature above the melting point of the crystallizable polystyrene to obtain a pre-form in the shape of a flat sheet, annealing the flat sheet at a temperature below the melting point to effect crystallization of the isotactic polystyrene, and then shaping the annealed sheet at a temperature below the temperature of complete melting of the crystals of polystyrene.

10. A method for making shaped articles of crystalline, linear, high polymers of styrene from a mixture of polystyrenes consisting of non-crystallizable atactic polymers, block polymers, and crystallizable isotactic polymers, which comprises extracting the mixture of polymers with a ketone at a temperature below 180° C. but above the boiling point of methyl-ethyl-ketone, to selectively dissolve out the non-crystallizable atactic polymers and the block polymers, molding the residue of the extraction at a temperature above the melting point of the crystallizable polystyrene to obtain a pre-form in the shape of a flat sheet, annealing the flat sheet at a temperature below the melting point to effect crystallization of the isotactic polystyrene, and then shaping the sheet to final shaped condition by vacuum forming methods.

11. A method for making shaped articles of crystalline, linear, high polymers of styrene from a mixture of polystyrenes consisting of non-crystallizable atactic polymers, block polymers, and crystallizable isotactic polymers, which comprises extracting the mixture of polymers with a ketone at a temperature below 180° C. but above the boiling point of methyl-ethyl-ketone, to selectively dissolve out the non-crystallizable atactic polymers and the block polymers, molding the residue of the extraction at a temperature above the melting point of the crystallizable polystyrene to obtain a pre-form in the shape of a flat sheet, annealing the flat sheet at a temperature below the melting point to effect crystallization of the isotactic polystyrene, and then drawing the sheet into an article of desired final shape.

References Cited in the file of this patent

UNITED STATES PATENTS

| | | |
|---|---|---|
| 1,683,402 | Ostromislensky | Sept. 4, 1928 |
| 2,232,475 | Renfrew et al. | Feb. 18, 1941 |
| 2,714,101 | Amos et al. | July 26, 1955 |
| 2,721,357 | Hochberg | Oct. 25, 1955 |

FOREIGN PATENTS

| | | |
|---|---|---|
| 538,782 | Belgium | Dec. 6, 1955 |

OTHER REFERENCES

J.A.C.S., Mar. 20, 1955, vol. 77, pp. 1708–10.

UNITED STATES PATENT OFFICE

CERTIFICATE OF CORRECTION

Patent No. 2,896,264                                      July 28, 1959

Giulio Natta et al.

It is hereby certified that error appears in the above numbered patent requiring correction and that the said Letters Patent should read as corrected below.

In the heading to the printed specification, between lines 11 and 13, insert -- Claims priority, application Italy November 8, 1956 --.

Signed and sealed this 17th day of May 1960.

(SEAL)
Attest:

KARL H. AXLINE                                                  ROBERT C. WATSON
Attesting Officer                                          Commissioner of Patents